United States Patent
Liu et al.

(10) Patent No.: US 12,131,106 B2
(45) Date of Patent: Oct. 29, 2024

(54) LAYOUT METHOD AND APPARATUS BASED ON GENETIC ALGORITHM

(71) Applicant: SHENZHEN XUMI YUNTU SPACE TECHNOLOGY CO., LTD., Shenzhen (CN)

(72) Inventors: Limei Liu, Shenzhen (CN); Xiaopeng Xu, Shenzhen (CN); Chuanpeng Yu, Shenzhen (CN)

(73) Assignee: SHENZHEN XUMI YUNTU SPACE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/697,746

(22) PCT Filed: Oct. 18, 2022

(86) PCT No.: PCT/CN2022/126024
§ 371 (c)(1),
(2) Date: Apr. 2, 2024

(87) PCT Pub. No.: WO2023/066266
PCT Pub. Date: Apr. 27, 2023

(65) Prior Publication Data
US 2024/0330547 A1 Oct. 3, 2024

(30) Foreign Application Priority Data
Oct. 19, 2021 (CN) .......................... 202111213455.8

(51) Int. Cl.
*G06F 30/27* (2020.01)
*G06F 30/13* (2020.01)
*G06F 111/06* (2020.01)

(52) U.S. Cl.
CPC .............. *G06F 30/27* (2020.01); *G06F 30/13* (2020.01); *G06F 2111/06* (2020.01)

(58) Field of Classification Search
USPC .......................................................... 703/1
See application file for complete search history.

(56) References Cited

U.S. PATENT DOCUMENTS

2017/0124455 A1* 5/2017 Rope .................. G06F 16/904

FOREIGN PATENT DOCUMENTS

| CN | 102592031 A | 7/2012 |
| CN | 103500255 A | 1/2014 |

(Continued)

OTHER PUBLICATIONS

Yang Weibo, et al., Packing optimization of rectangles based on improved genetic annealing algorithm, Computer Engineering and Applications, 2016, pp. 259-263, vol. 52 No. 7.

(Continued)

*Primary Examiner* — Bryce M Aisaka
(74) *Attorney, Agent, or Firm* — Bayramoglu Law Offices LLC

(57) ABSTRACT

A layout method and apparatus based on a genetic algorithm are provided. The method includes: determining a gene code mode based on standard part information and layout part information; generating an initial population based on the gene code mode, the initial population including a plurality of gene codes, and the gene codes including standard code segments and layout code segments, and corresponding to layout schemes of standard parts and layout parts; acquiring fitness of each gene code; determining a dominant gene code based on the fitness; performing a double-point crossing operation and a double-point mutation operation on the dominant gene code to generate a next generation gene code, so as to form a dominant population; and if a preset termination condition is met, determining the layout scheme corresponding to the dominant gene code in the dominant population as a target layout scheme.

13 Claims, 7 Drawing Sheets

(56) References Cited

FOREIGN PATENT DOCUMENTS

| | | | |
|---|---|---|---|
| CN | 103793555 | A | 5/2014 |
| CN | 108090650 | A | 5/2018 |
| CN | 108985439 | A | 12/2018 |
| CN | 110390360 | A | 10/2019 |
| CN | 111260062 | A | 6/2020 |
| CN | 112926819 | A | 6/2021 |
| CN | 113158580 | A | 7/2021 |
| CN | 113642264 | A | 11/2021 |
| WO | 2016163048 | A1 | 10/2016 |

OTHER PUBLICATIONS

Yingbo Deng, Research and application of rectangular optimized nesting with process constraints, China Master's Theses Full-text Database Engineering Science and Technology II, 2014, pp. 22-41, vol. 6.

Deng Ying-Bo, et al., A Hybrid Algorithm for Fullerboard Packing Problem, Machinery Design & Manufacture, 2013, pp. 23-25, vol. 3.

Sun Jiazheng, et al., Improved dual population genetic algorithm for rectangle packing, Computer Engineering and Applications, 2018, pp. 139-146, vol. 54 No. 15.

Song Xue-Feng, et al., Solving Rectangular Packing Problem Based on Genetic Algorithm, Coal Mine Machinery, 2011, pp. 119-121, vol. 32 No. 5.

\* cited by examiner

LAYOUT METHOD AND APPARATUS BASED ON GENETIC ALGORITHM

CROSS-REFERENCE TO THE RELATED APPLICATIONS

This application is the national phase entry of International Application No. PCT/CN2022/126024, filed on Oct. 18, 2022, which is based upon and claims priority to Chinese Patent Application No. 202111213455.8, filed on Oct. 19, 2021, the entire contents of which are incorporated herein by reference.

TECHNICAL FIELD

The present disclosure relates to the field of computer technologies, and in particular to, a layout method and apparatus based on a genetic algorithm.

BACKGROUND

Indoor decoration is usually required before occupancy of a house by a delivery user. Requirements for shapes, sizes, or the like, of materials are different due to different structures in rooms, and materials provided by factories are usually standard parts, such that the raw materials are required to be cut during the decoration to obtain non-standard parts meeting the requirements. However, when the standard parts are cut in the prior art, the non-standard parts are generally laid out and cut based on manual experience, resulting in high loss of the standard parts and a low material utilization rate.

SUMMARY

In view of this, embodiments of the present disclosure provide a layout method and apparatus based on a genetic algorithm, so as to solve the problem in the prior art that a material utilization rate is low when non-standard parts are laid out.

In a first aspect of the embodiments of the present disclosure, there is provided a layout method based on a genetic algorithm, including:
  determining a gene code mode based on standard part information and layout part information;
  generating an initial population based on the gene code mode, the initial population including a plurality of gene codes, and the gene codes including standard code segments and layout code segments, and corresponding to layout schemes of standard parts and layout parts;
  acquiring fitness of each of the plurality of gene codes;
  based on the fitness, determining the gene code corresponding to the fitness meeting a preset requirement as a dominant gene code;
  performing a double-point crossing operation and a double-point mutation operation on the dominant gene code to generate a next generation gene code, so as to form a dominant population; and
  if a preset termination condition is met, determining the layout scheme corresponding to the dominant gene code in the dominant population as a target layout scheme.

In a second aspect of the embodiments of the present disclosure, there is provided a layout apparatus based on a genetic algorithm, including:
  a code mode determining module configured to determine a gene code mode based on standard part information and layout part information;
  an initial population generating module configured to generate an initial population based on the gene code mode, the initial population including a plurality of gene codes, and the gene codes including standard code segments and layout code segments, and corresponding to layout schemes of standard parts and layout parts;
  a fitness acquiring module configured to acquire fitness of each of the plurality of gene codes;
  a dominant gene code determining module configured to, based on the fitness, determine the gene code corresponding to the fitness meeting a preset requirement as a dominant gene code;
  a dominant population generating module configured to perform a double-point crossing operation and a double-point mutation operation on the dominant gene code to generate a next generation gene code, so as to form a dominant population; and
  a target layout determining module configured to, if a preset termination condition is met, determine the layout scheme corresponding to the dominant gene code in the dominant population as a target layout scheme.

In a third aspect of the embodiments of the present disclosure, there is provided a computer device, including a memory, a processor and a computer program stored in the memory and runnable on the processor, wherein the processor, when executing the computer program, implements the steps of the above method.

In a fourth aspect of the embodiments of the present disclosure, there is provided a computer-readable storage medium storing a computer program, wherein the computer program, when executed by a processor, implements the steps of the above method.

Compared with the prior art, the embodiments of the present disclosure have the following beneficial effects: in the technical solution of the embodiments of the present disclosure, gene coding is performed on the standard parts and the layout parts in a two-segment type code mode, the gene codes are screened using the fitness to obtain the dominant gene code, and meanwhile, the double-point crossing and mutation operations are adopted in the process of generating the dominant population, thereby greatly improving a population iteration rate, quickly obtaining the target layout scheme, reducing material loss, greatly reducing a calculation amount and improving a calculation efficiency.

BRIEF DESCRIPTION OF THE DRAWINGS

In order to more clearly illustrate the technical solutions in the embodiments of the present disclosure, the accompanying drawings used in the description of the embodiments or the prior art will be briefly introduced below. It is apparent that, the accompanying drawings in the following description are only some embodiments of the present disclosure, and other drawings can be obtained by those of ordinary skill in the art from the provided drawings without creative efforts.

DETAILED DESCRIPTION OF THE EMBODIMENTS

Figure 1:
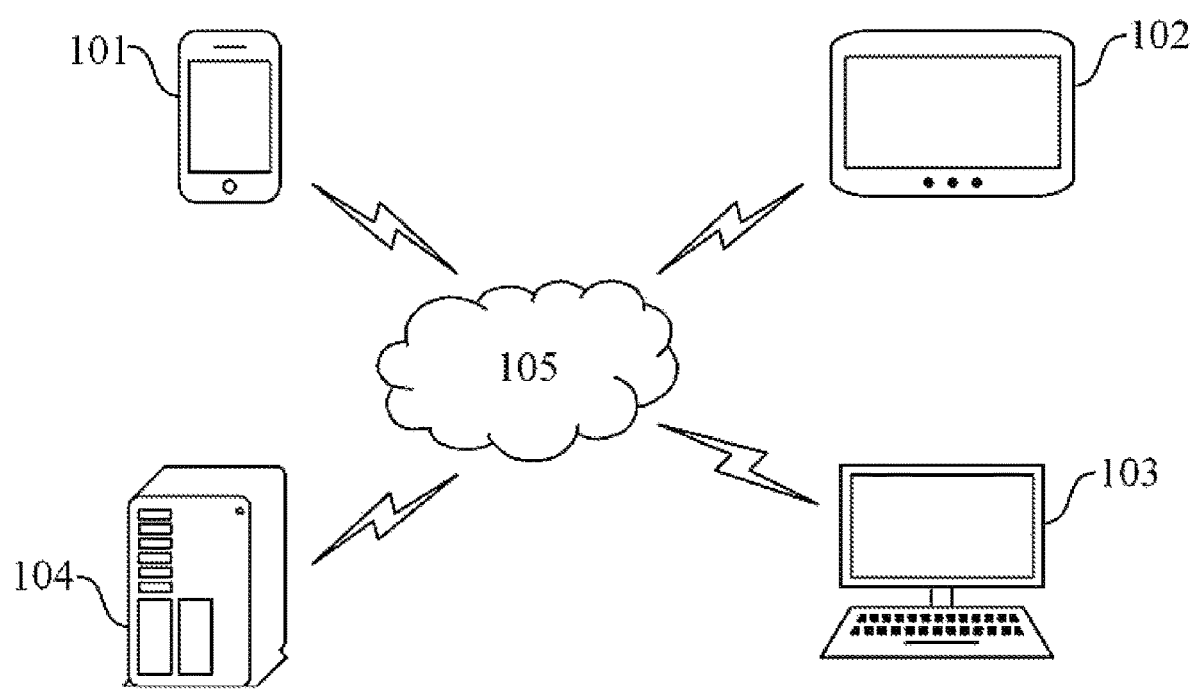
FIG. 1 is a schematic diagram of an application scenario of an embodiment of the present disclosure.

In the following description, for the purpose of illustration instead of limitation, specific details such as a particular system structure and a technology are provided to make the embodiments of the present disclosure understood thoroughly. However, it should be understood by those skilled in the art that the present disclosure can also be implemented in other embodiments without the specific details. In other cases, detailed description of well-known systems, apparatuses, circuits and methods is omitted, so that the present disclosure is described without being impeded by unnecessary details.

During decoration of rooms, materials with different shapes, sizes, colors or material properties are usually required to meet requirements of different positions and structures for the materials, and materials provided by factories are generally standard parts, such that in an actual use process, the raw materials (i.e., the standard parts) are required to be cut to obtain non-standard parts (i.e., layout parts) meeting the requirements. When the standard part is cut, at least one layout part is required to be arranged on the standard part, and a size of the layout part is required to be smaller than that of the standard part, such that the layout part can be obtained by cutting the standard part, and a cut part which cannot be used continuously is an excess material. In order to reduce material loss, as many layout parts as possible are required to be arranged on the standard part without overlapping, so as to reduce the excess material.

Taking decorative wallboards as an example, in an indoor decoration design process, after a wallboard arrangement drawing or model is obtained, size and attribute information of the wallboards at different positions in a room can be further obtained, the attribute information includes a grooving mode, a color, a material property, or the like, and the material property includes information, such as a texture. Since provided wallboards are standard wallboards, and wallboards required in actual use are non-standard wallboards, a layout is required to be performed on the standard wallboards according to the size and attribute information of the wallboards to obtain the non-standard wallboards meeting requirements for use. It should be understood that in addition to the decorative wallboards, other materials may have similar problems, such as, but not limited to, tiles, window boards, edge strips and baseboards.

When the non-standard part is laid out, in a current commonly adopted method, arrangement and combination are performed to obtain a layout result according to manual experience, but strong subjectivity exists during the layout according to the manual experience, and sufficient use of the standard part is difficult to guarantee, resulting in high loss of the standard part and a low material utilization rate. Moreover, in the case of various kinds of standard parts and layout parts, a layout work load is huge, and a manual layout efficiency is low.

In addition to the layout according to the manual experience, a conceivable method is a single-board carry method. For example, if the layout parts have sizes of 280×2,000 (mm) and 420×2,000 (mm), and the standard parts have sizes of 300×2,000 (mm) and 600×2,000 (mm), it is determined with the single-board carry method that the carry of the layout part of 280×2,000 (mm) is the standard part of 300×2,000 (mm), and the carry of the layout part of 420×2,000 (mm) is the standard part of 420×2,000 (mm). The single-board carry method is simple during the layout, but since only one layout part is arranged on one standard part, material waste is prone to be caused, resulting in high material loss and the low material utilization rate. Another conceivable method is an exhaustive method; that is, all standard parts and all layout parts are arranged indiscriminately, and theoretically, all possible layout schemes are exhausted, and then, the layout scheme with smallest loss is selected. However, this method has a huge corresponding calculation amount; for example, for 200 kinds of layout parts with different sizes and attributes, 10,282 layout schemes may exist, the calculation amount is huge, and a calculation efficiency is low.

An embodiment of the present disclosure provides a completely different automatic layout method in which the layout part is laid out on the standard part using an improved genetic algorithm, gene coding is performed in a two-segment type gene code mode, and meanwhile, double-point crossing and mutation operations are adopted in a process of generating a dominant population, thereby greatly improving a population iteration rate, quickly obtaining a target layout scheme, reducing the material loss, reducing the calculation amount and improving the calculation efficiency.

A layout method and apparatus based on a genetic algorithm according to embodiments of the present disclosure will be described in detail below with reference to the accompanying drawings.

FIG. 1 is a schematic diagram of an application scenario of an embodiment of the present disclosure. The application scenario may include terminal devices 101, 102 and 103, a server 104 and a network 105.

The terminal devices 101, 102 and 103 may be hardware or software. When the terminal devices 101, 102 and 103 are hardware, the terminal devices may be various electronic devices having display screens and supporting communication with the server 104, including but not limited to smart phones, tablet computers, laptop portable computers, desktop computers, or the like, and the display screen of the terminal device may be a touch display screen or a non-touch display screen, and at this point, the terminal device is further provided with an interactive device, such as a mouse and a keyboard. When the terminal devices 101, 102 and 103 are software, the terminal devices can be installed in the electronic device as described above. The terminal devices 101, 102 and 103 may be implemented as a plurality of pieces of software or software modules, or may be implemented as a single piece of software or software module, which is not limited in the embodiment of the present disclosure. Further, various applications, such as a material layout application, a data processing application and a search type application, may be installed on the terminal devices 101, 102 and 103.

The server 104 may be a server providing various services, for example, a background server receiving a request sent by a terminal device establishing communication connection with the server, and the background server may receive and analyze the request sent by the terminal device, and generate a processing result. The server 104 may be a server, or a server cluster composed of a plurality of servers, or a cloud computing service center, which is not limited in the embodiment of the present disclosure. It should be noted that the server 104 may be hardware or software. When the server 104 is hardware, the server may be various electronic devices providing various services for the terminal devices 101, 102 and 103. When the server 104 is software, the server may be plural pieces of software or software modules providing various services for the terminal devices 101, 102 and 103, or may be a single piece of software or software module providing various services for the terminal devices 101, 102 and 103, which is not limited in the embodiment of the present disclosure.

The network 105 may be a wired network formed by connection using a coaxial cable, a twisted pair cable, and an optical fiber, or may be a wireless network which can interconnect various communication devices without wiring, for example, WIFI, Bluetooth, Near Field Communication (NFC), Infrared, or the like, which is not limited in the embodiment of the present disclosure.

A user can establish communication connection with the server 104 through the network 105 by the terminal devices 101, 102 and 103 to receive or transmit information, or the like. Specifically, the terminal device is provided with a material layout application, and in a running process of the material layout application, an interface of the terminal device displays a layout page, and the layout page can be designed by using a visualization engine. The user inputs basic information, such as standard part information and layout part information, by the terminal device, and the terminal device receives the basic information for layout and then sends the basic information to the server 104. The server 104 determines a gene code mode based on the obtained standard part information and the obtained layout part information, generates an initial population including a plurality of gene codes based on the gene code mode, and calculates fitness of each gene code. Further, the server 104 determines the gene code corresponding to the fitness meeting a preset requirement as a dominant gene code, performs a double-point crossing operation and a double-point mutation operation on the dominant gene code to generate a next generation gene code, so as to form a dominant population, and performs fitness calculation, dominant gene code determination, or the like, again based on the dominant population to iterate the population. In the iteration process, the server 104 judges whether a preset iteration termination condition is met, and if the preset iteration termination condition is met, the layout scheme corresponding to the dominant gene code in the dominant population is determined as a target layout scheme and displayed by the terminal device, so as to ensure that the user can check the target layout scheme.

It should be noted that specific types, numbers, and combinations of the terminal devices 101, 102 and 103, the server 104 and the network 105 may be adjusted according to actual needs of the application scenario, which is not limited in the embodiment of the present disclosure.

In other embodiments, the layout method based on a genetic algorithm according to the present embodiment may also be implemented only by the terminal device, and at this point, the terminal device is provided therein with plural pieces of software or software modules providing various services, or may be a single piece of software or software module providing various services, which is not limited here.

Figure 2:
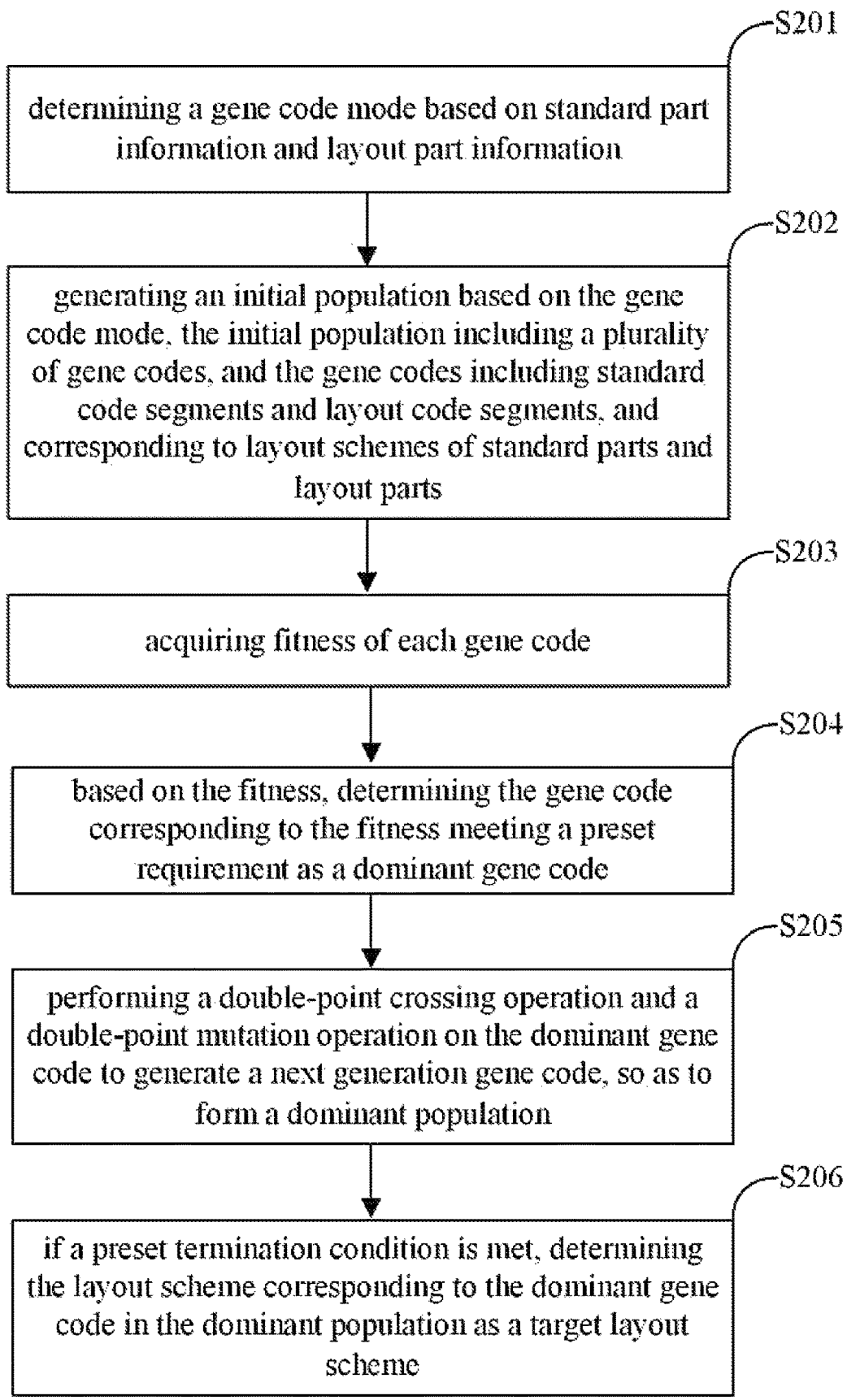
FIG. 2 is a flowchart of a layout method based on a genetic algorithm according to the embodiment of the present disclosure.

FIG. 2 is a flowchart of a layout method based on a genetic algorithm according to the embodiment of the present disclosure. The layout method based on a genetic algorithm of FIG. 2 may be performed by the terminal device or the server of FIG. 1. The genetic algorithm (GA) is a computational model of a biological evolution process which simulates natural selection and genetic mechanisms of Darwinian biological evolutionism, and is a method for searching for an optimal solution by simulating a natural evolution process. According to the embodiment of the present disclosure, a layout is performed based on the genetic algorithm to obtain a layout scheme which satisfies a condition. As shown in FIG. 2, the layout method based on a genetic algorithm includes:

S201: determining a gene code mode based on standard part information and layout part information.

In the present embodiment, standard parts refer to materials with fixed sizes, are produced by factories in a unified manner and can be regarded as standardized products; layout parts refer to materials with different sizes required by different scenarios in actual engineering and are determined according to actual application scenarios. The standard parts and the layout parts can be materials classified by a specification area (e.g, wallboards, tiles, etc.) or by a specification length (e.g., edge strips, baseboards, etc.). The layout means that an arrangement is performed on the standard part according to the layout part information and cutting is performed based on an arrangement mode to obtain the layout part, so as to fully use the standard part to reduce material loss.

It should be appreciated that in order to ensure that the layout part may be obtained by cutting the standard part, the size of the layout part is required to be not greater than the size of the standard part, and the size of the layout part may be the same as the size of the standard part; for example, the size of the layout part required in a particular use scenario may be exactly the same as the size of a certain standard. The "not greater than" here means that each size of the layout part is required to be not greater than the corresponding size of the standard part; for example, for materials classified by the specification area, the length and width of the layout part are required to be correspondingly not greater than the length and width of the standard part; for materials classified by the specification length, the length of the layout part is required to be correspondingly not greater than that of the standard part.

During the layout, the standard part information and the layout part information are required to be acquired firstly. The acquisition of the standard part information and the layout part information can be carried out as required. For example, when the terminal device displays a layout page, the layout page may give a prompt of inputting the standard part information, and at this point, a user inputs the standard part information through a touch screen or a peripheral by clicking a corresponding position of the page, and the input mode may be entering of the standard part information or selection of the corresponding standard part from a standard library. The layout page can also give a prompt of inputting the layout part information, and at this point, the user inputs the layout part information through the touch screen or the peripheral by clicking the corresponding position of the page, and as the input mode, the layout part information may be entered, or the corresponding layout part can be selected from an engineering library, or a design drawing can be input, and the design drawing is analyzed to obtain the layout part information.

House decoration is taken as an example for explanation. Different materials are required during the decoration of a house, a standard library can be established according to decoration requirements, and the standard library includes the information of the standard parts of selectable materials. Since rooms have different structures, the required layout parts have different sizes, an engineering library can be established according to the room structure, and the engineering library includes the information of the actually required layout parts. Certainly, the layout part information may also be obtained by identifying a decoration design drawing or model without establishing the engineering library; for example, a wallboard arrangement drawing is drawn in the decoration design process, and information of wallboard layout parts can be obtained by analyzing the drawing.

Figure 5:
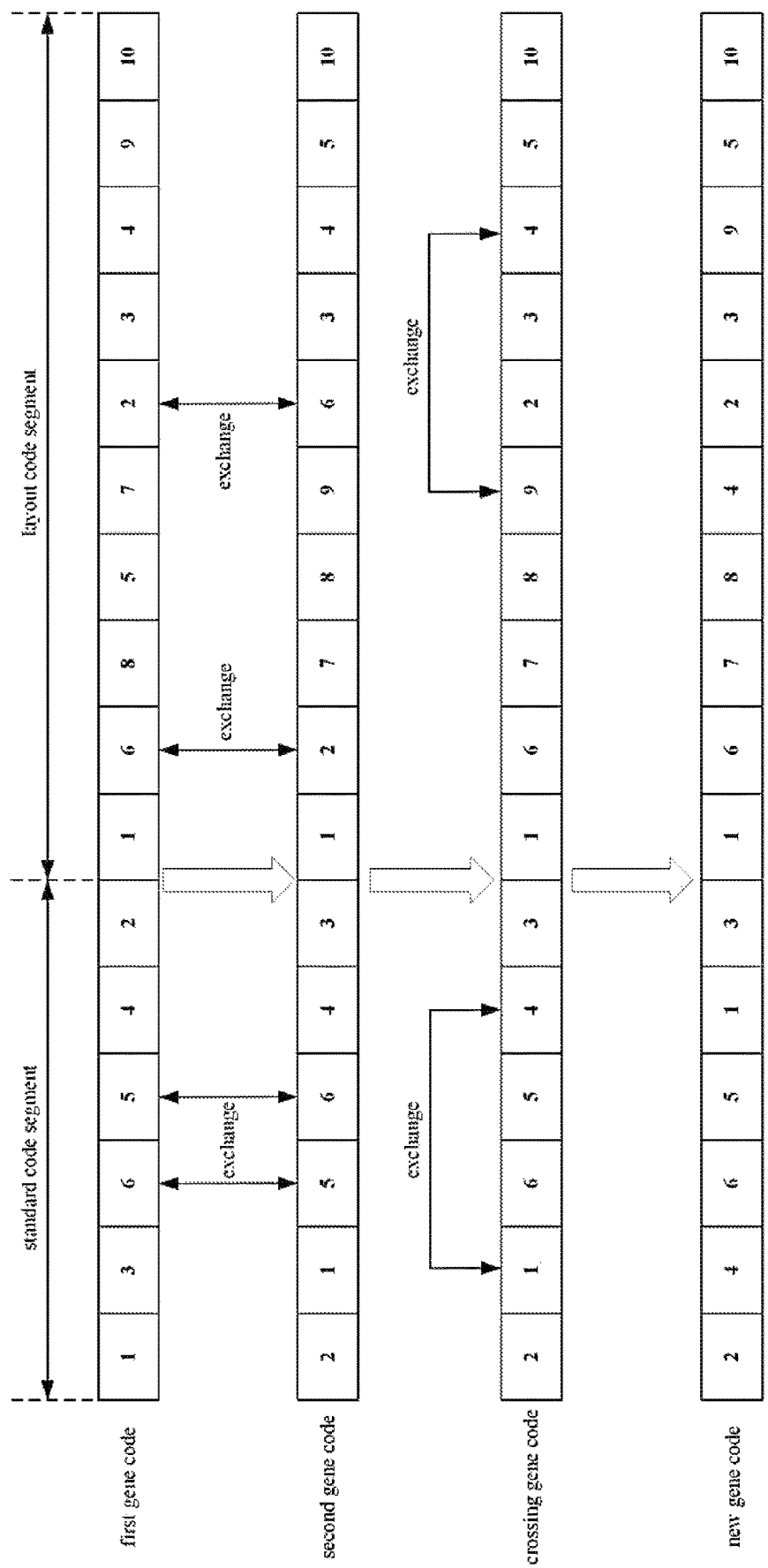
FIG. 5 is a schematic diagram of wallboards with different grooving modes in the layout method based on a genetic algorithm according to the embodiment of the present disclosure.

After the standard part information and the layout part information are obtained, a gene code mode can be determined, and the gene code mode determines a form of a generated gene code and a gene code structure. Referring to FIG. 5, in the embodiment of the present disclosure, a two-segment type code is adopted, the obtained gene code includes a standard code segment and a layout code segment, and the two code segments are connected together. The standard code segment includes at least one code, and when a plurality of codes are included, a code order thereof corresponds to a standard part sequence; the layout code segment includes at least one code, and when plural codes are included, a code order thereof corresponds to a layout part sequence.

S202: generating an initial population based on the gene code mode, the initial population including a plurality of gene codes, and the gene codes including standard code segments and layout code segments, and corresponding to layout schemes of standard parts and layout parts.

Each gene code of the initial population can be generated randomly or according to other ways, and the code orders of the generated gene codes correspond to different layout schemes. The standard code segments of the gene codes correspond to sequencing of the standard parts, the layout code segments of the gene codes correspond to sequencing of the layout parts, and during the layout, the layout parts arranged in the front are preferentially selected to be laid out on the standard parts arranged in the front. A number of the generated gene codes is adapted to a length of the gene codes, and the length of the gene codes is related to categories of the standard parts and the layout parts. For example, the more the categories of the standard parts, the more the types of the standard parts which can be selected, and the longer the standard code segment; the more the categories of the layout parts, the more the types of the required layout parts, the longer the layout code segment, and therefore the longer the gene code. The longer the gene code, the greater the number of the gene codes in the generated initial population, so as to increase diversity of the population.

S203: acquiring fitness of each of the plurality of gene codes.

The fitness reflects adaptability of an individual corresponding to the gene code, and the higher the fitness, the stronger the adaptability of the individual corresponding to the gene code, the more obvious the advantages thereof, and the higher the possibility of serving as an optimal solution. By calculating the fitness of all the gene codes in the initial population, adaptability of the initial population can be obtained.

S204: based on the fitness, determining the gene code corresponding to the fitness meeting a preset requirement as a dominant gene code.

In the embodiment of the present disclosure, the fitness of the gene code reflects a condition of an excess material generated in the layout process, and the higher the fitness of the gene code is, the fewer the excess material generated in a cutting process of the corresponding layout scheme is, the higher the material utilization rate is, and the better the evolution of the population is facilitated after the gene code is determined as the dominant gene code, thereby facilitating obtaining of the optimal solution. A number of the dominant gene codes may be one or more, which is not limited herein.

S205: performing a double-point crossing operation and a double-point mutation operation on the dominant gene code to generate a next generation gene code, so as to form a dominant population.

The dominant gene code is subjected to the crossing and mutation operations, such that the diversity of the population can be increased to accelerate obtaining of the optimal solution. In the embodiment of the present disclosure, a double-point crossing mode is adopted to carry out the crossing operation on the dominant gene codes; that is, the standard code segment and the layout code segment are both subjected to the crossing operation, and in the crossing operation process, the standard code segments of the two dominant gene codes are correspondingly subjected to the crossing operation, and the layout code segments are correspondingly subjected to the crossing operation. In the embodiment of the present disclosure, a double-point mutation mode is further adopted to carry out the mutation operation on the gene codes subjected to the double-point crossing operation; that is, the standard code segment and the layout code segment are both subjected to the mutation operation, and in the mutation operation process, the standard code segments of the gene codes are subjected to the mutation operation, and the layout code segments are subjected to the mutation operation. After the double-point crossing and double-point mutation operations, the diversity of the gene codes in the dominant population obtained in the present disclosure is further enhanced.

S206: if a preset termination condition is met, determining the layout scheme corresponding to the dominant gene code in the dominant population as a target layout scheme.

For the obtained dominant population, the gene codes are required to be iterated continuously through fitness calculation, dominant gene code determination, gene code crossing and gene code mutation processes, so as to realize population evolution. When the termination condition is met, the population evolves completely, the dominant gene code meeting the condition is obtained, and at this point, the iteration of the gene codes is terminated, the fitness corresponding to the dominant gene code in the dominant population is highest, the corresponding layout scheme is determined as the target layout scheme, the produced excess materials are fewer, and the material utilization rate is higher.

In the technical solution of the embodiments of the present disclosure, gene coding is performed on the standard parts and the layout parts in a two-segment type code mode, the gene codes are screened using the fitness to obtain the dominant gene code, and meanwhile, the double-point crossing and mutation operations are adopted in the process of generating the dominant population, thereby greatly improving a population iteration rate, quickly obtaining the target layout scheme, reducing material loss, greatly reducing a calculation amount and improving a calculation efficiency.

Further, the manner of determining the gene codes in step S201 is also different based on different standard part information and different layout part information.

In some embodiments, the standard part information includes at least a standard part category and a standard part size, and the layout part information includes at least a layout part category and a layout part size. Each category of standard parts corresponds to one standard part size; for example, the standard parts of category "1" correspond to a size of 300×2,000 (mm), the standard parts of category "2" correspond to a size of 600×2,000 (mm), and so on; each category of layout parts corresponds to one layout part size; for example, the layout parts of category "1" correspond to a size of 280×2,000 (mm), the layout parts of category "2" correspond to a size of 420×2,000 (mm), and so on.

After the standard part information is obtained, a number of the codes of the standard code segment can be determined based on a number of the categories of the standard parts, each code corresponds to one standard part category, the plural codes are sequentially arranged, and the standard part corresponding to the code arranged in the front is preferentially subjected to the layout in the layout process. After the layout part information is obtained, a number of the codes of the layout code segment can be determined based on a number of the categories of the layout parts, each code corresponds to one layout part category, the plural codes are sequentially arranged, and the layout part corresponding to the code arranged in the front is preferentially subjected to the layout in the layout process. After a mode of the standard code segment and a mode of the layout code segment are determined, the gene code mode can be determined; that is, the standard code segment and the layout code segment are connected together to obtain the gene code; a position relationship between the standard code segment and the layout code segment can be set as required; for example, the standard code segment is in the front and the layout code segment is in the rear, or the layout code segment is in the front and the standard code segment is in the rear, which is not limited here. In the present embodiment, each standard part category does not have a priority, and each code in the standard code segment can be randomly generated; that is, during the layout, the type of the standard parts can be arbitrarily selected for the layout.

In some embodiments, considering actual engineering requirements, one or more types of standard parts are required to be preferentially adopted for the layout, and then, other types of standard parts are considered, and at this point, the priority of each standard part is required to be defined, and the higher the priority, the earlier the position of the corresponding code, and the codes are kept unchanged in a subsequent process. At this point, the standard part information includes at least the standard part category, the standard part size and the standard part priority, and the layout part information includes at least the layout part category and the layout part size. Each category of standard parts corresponds to one standard part size and each category of layout parts corresponds to one layout part size.

After the standard part information is obtained, the number of the codes of the standard code segment can be determined based on the number of the categories of the standard parts, each code corresponds to one standard part category, the plural codes are sequentially arranged, the codes at the corresponding positions in the standard code segment are sequentially determined based on the priorities of the standard parts, and the standard part corresponding to the code arranged in the front is preferentially subjected to the layout in the layout process. For example, for 6 categories of standard parts, the standard parts of category "1" have the highest priority, the corresponding code is arranged at a first position of the standard code segment, and at this point, the code at the position is fixed as the code for the standard parts of category "1", and last 5 codes can be randomly determined. After the layout part information is obtained, the number of the codes of the layout code segment can be determined based on the number of the categories of the layout parts, each code corresponds to one layout part category, the plural codes are sequentially arranged, and the layout part corresponding to the code arranged in the front is preferentially subjected to the layout in the layout process. The gene code can be obtained by connecting the standard code segment and the layout code segment. In the present embodiment, since the priorities of the various categories of standard parts are different, for the standard parts with priorities, the codes at the corresponding positions in the standard code segment are sequentially determined according to the priorities of the standard parts, and for the standard parts without priorities, the codes at the subsequent positions are randomly filled in a code generation process.

In the process of generating the initial population, the manner of generating the gene codes is different according to different gene code manners. If all the standard parts do not have priorities, when the gene codes are generated, the codes corresponding to the standard parts are randomly generated at the positions of the standard code segments, and the codes corresponding to the layout parts are randomly generated at the positions of the layout code segments. If some standard parts have priorities, when the gene codes are generated, the codes at the positions corresponding to the standard parts with the priorities in the standard code segments are unchanged, the codes corresponding to the other standard parts are randomly generated at the subsequent code positions, and the codes corresponding to the layout parts are randomly generated at the positions of the layout code segments.

Figure 3:
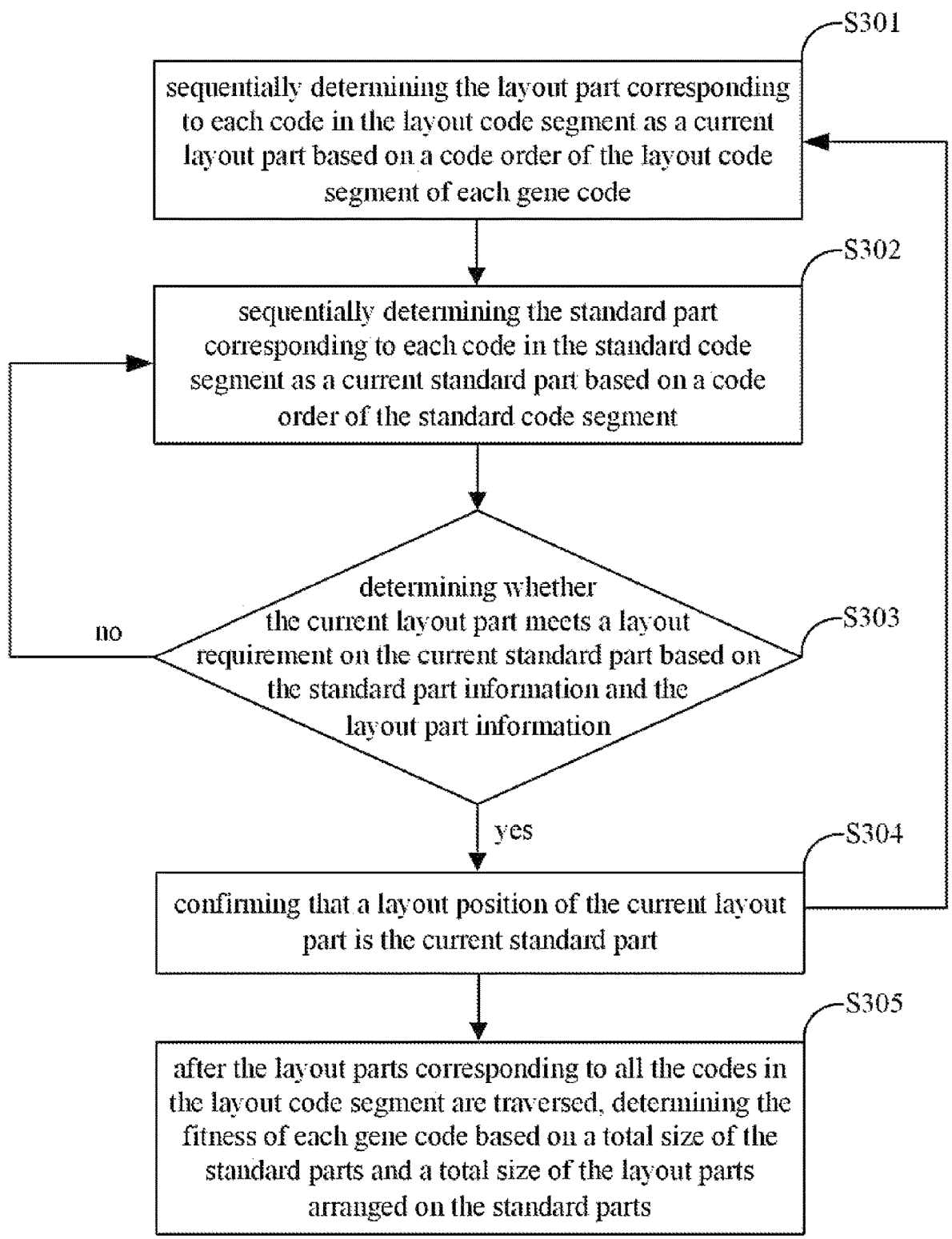
FIG. 3 is a flowchart of acquiring fitness of a gene code in the layout method based on a genetic algorithm according to the embodiment of the present disclosure.

After the initial population is generated, the fitness of each gene code is required to be further calculated. FIG. 3 is a flowchart of acquiring the fitness of the gene code in the embodiment of the present disclosure, and the step of acquiring fitness of each gene code in step S203 includes:

S301: sequentially determining the layout part corresponding to each code in the layout code segment as a current layout part based on a code order of the layout code segment of each gene code;

S302: sequentially determining the standard part corresponding to each code in the standard code segment as a current standard part based on a code order of the standard code segment;

S303: determining whether the current layout part meets a layout requirement on the current standard part based on the standard part information and the layout part information;

if the current layout part meets the layout requirement on the current standard part:

S304: confirming that a layout position of the current layout part is the current standard part, and returning to step S301;

if the current layout part does not meet the layout requirement on the current standard part, returning to step S302;

S305: after the layout parts corresponding to all the codes in the layout code segment are traversed, determining the fitness of each gene code based on a total size of the standard parts and a total size of the layout parts arranged on the standard parts.

Specifically, 6 categories of standard parts and 10 categories of layout parts are taken as an example for explanation (as shown in FIG. 5). The codes of the 6 types of standard parts are 1, 2, 3, 4, 5 and 6 respectively, the codes of the 10 types of layout parts are 1, 2, 3, 4, 5, 6, 7, 8, 9 and 10 respectively, the codes of the standard code segment of one randomly generated gene code are sequentially 1, 3, 6, 5, 4 and 2, and the codes of the layout code segment are sequentially 1, 6, 8, 5, 7, 2, 3, 4, 9 and 10. Firstly, the layout part corresponding to the code "1" at the first position in the layout code segment is determined as the current layout part, and the standard part corresponding to the code "1" at the first position in the standard code segment is determined as the current standard part; the current layout part is laid out on the current standard part, whether the layout requirement is met is determined, and if the layout requirement is met, the layout position of the current layout part "1" is determined to be the current standard part "1". Continuously, the layout part corresponding to the code "3" at the second position in the layout code segment is determined as the current layout part, and the standard part corresponding to the code "1" at the first position in the standard code segment is determined as the current standard part; the current layout part is laid out on the current standard part, whether the layout requirement is met is determined, and if the layout requirement is not met, the standard part corresponding to the code "6" at the second position in the standard code segment is continuously determined as the current standard part; the current layout part is laid out on the current standard part, whether the layout requirement is met is determined, and if the layout requirement is met, the layout position of the current layout part "3" is determined to be the current standard part "6". In the same way, the layout parts corresponding to all the codes in the layout code segment are traversed until all the layout parts finish the layout on the standard part, and the layout process is ended. Then, based on the layout result, the fitness of the gene code is calculated.

When whether the current layout part meets the layout requirement on the current standard part is determined, the layout requirement is correspondingly different according to different standard part and layout part information.

In some embodiments, the standard part information includes the standard part category and the standard part size, the layout part information includes the layout part category and the layout part size, and at this point, during the layout, a remaining size of the current standard part is determined based on the size of the current standard part and the size of the layout part arranged thereon; and whether the current layout part can be arranged on the current standard part or not is determined based on the size of the current layout part and the remaining size of the current standard part. Specifically, since the size of the standard part is not smaller than the size of the layout part, more than one layout part may be arranged on the standard part, the layout parts are sequentially laid out on the standard part in the layout process, and if a layout part is already arranged on the standard part, it is necessary to confirm whether the remaining size of the standard part is sufficient for the layout of the current layout part.

In some embodiments, the standard part information includes not only the standard part category and the standard part size, but also attribute information of the standard part, and the attribute information differs according to different materials, and may include at least one of a grooving mode, a color and a material property. During the layout, whether the attribute information of the current layout part is consistent with the attribute information of the current standard part or not is required to be confirmed first, and if yes, the remaining size of the current standard part is determined continuously based on the size of the current standard part and the size of the layout part arranged thereon; and whether the current layout part can be arranged on the current standard part or not is determined based on the size of the current layout part and the remaining size of the current standard part.

Figure 6C:
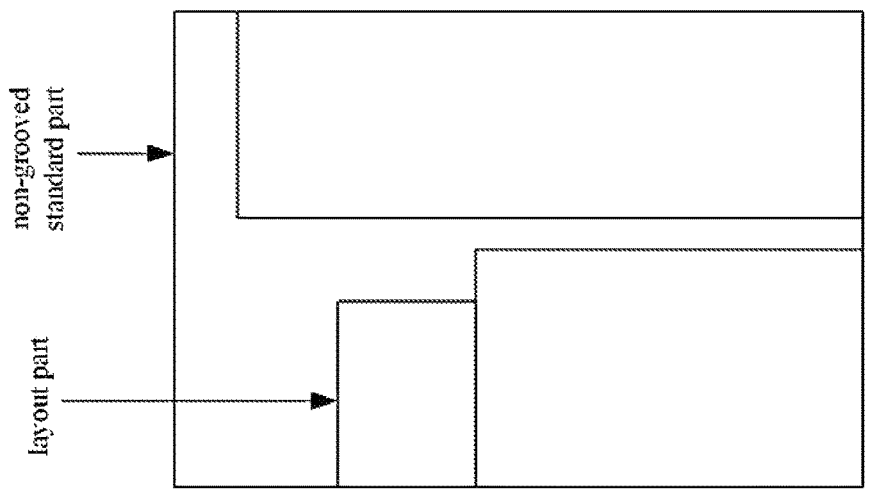
FIGS. 6A-6C show a schematic diagram of performing crossing and mutation operations on the gene code in the layout method based on a genetic algorithm according to the embodiment of the present disclosure.
Figure 6B:
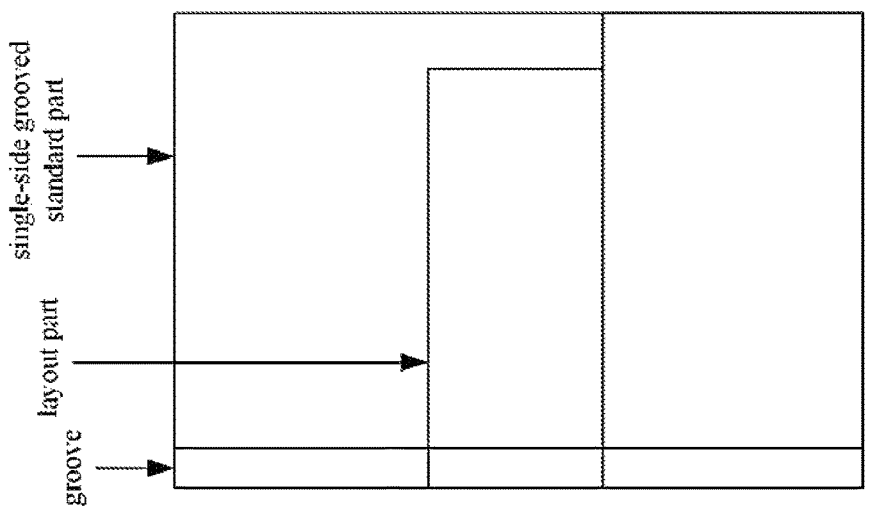
Figure 6A:
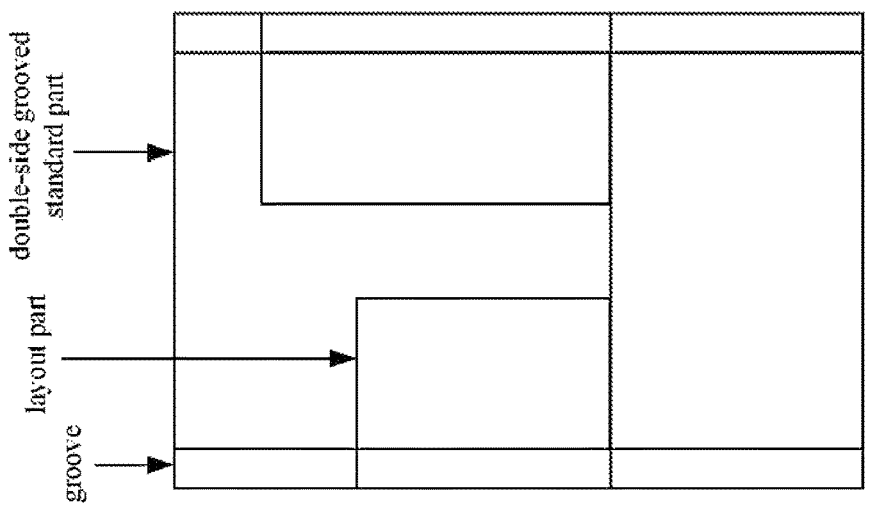

Taking wallboards as an example, according to the grooving mode, the wallboard standard parts include a double-side grooved standard part (as shown in FIG. 6A), a single-side grooved standard part (as shown in FIG. 6B) and a non-grooved standard part (as shown in FIG. 6C); the material property includes wood grain, leather grain, stone grain, or the like, according to style requirements. During the layout, whether the grooving mode of the current layout part is the same as that of the current standard part is judged, and if yes, whether the material property of the current layout part is the same as that of the current standard part is continuously judged, and if yes, the layout is performed according to the size. Different from the traditional way that after cutting, grooving is performed, and then, films with different material properties are pasted, in the embodiment of the present disclosure, the grooving mode and the material property are matched, the grooved finished standard parts with attached films with material properties are cut, the grooved layout parts with the pasted films can be directly obtained, a manufacturing process is simplified, and the obtained layout parts have better quality.

Taking the edge strip as an example, different edge strips have different colors, material properties and lengths, and during the layout, whether the color of the edge strip layout part is consistent with the color of the edge strip standard part is judged first; if yes, whether the material property of the edge strip layout part is consistent with that of the edge strip standard part is judged; if yes, the layout is performed according to the length.

Certainly, in other embodiments, the attribute information may further include other types of information, and is not limited to the above situation, which is not limited herein.

When the fitness of the gene codes is calculated based on the layout result, firstly, the excess materials of each category of standard parts are determined based on the size of each category of standard parts and the total size of the layout parts arranged on the standard parts; then, based on the excess materials of each category of standard parts, the total excess materials of the standard parts are determined; the fitness of each gene code is determined based on the total excess materials, and the fitness is the reciprocal of the total excess materials. The specific calculation mode differs according to different sizes, specifications and categories of the standard parts and the layout parts.

Taking the wallboard as an example, the size of the wallboard corresponds to an area of the wallboard, and therefore, the layout is performed according to the area of the current layout part and the remaining area of the current standard part, and a fitness calculation formula is as follows:

$$f(S) = \frac{1}{\sum_{i=1}^{m}\left(s_{standard,i} - \sum_{j=1}^{n} S_{layout,i,j}\right)}$$

wherein $S_{standard,i}$ represents the area of the ith standard part;
$S_{layout,i,j}$ represents the area of the jth layout part arranged on the ith standard part;
m represents a number of the categories of the standard parts;
n represents a number of the categories of the layout parts;

$$\sum_{i=1}^{n} S_{layout,i,j}$$

represents the total area of all the layout parts arranged on the ith standard part;

$$s_{standard,i} - \sum_{j=1}^{n} S_{layout,i,j}$$

represents the area of the excess material after the layer part is cut on the ith standard part;

$$\sum_{i=1}^{m}\left(s_{standard,i} - \sum_{j=1}^{n} S_{layout,i,j}\right)$$

represents the total area of the excess materials of all the standard parts;
  f(S) represents the fitness, i.e., the reciprocal of the total area of the excess materials, and the smaller the total area of the excess materials, the larger the value of the fitness, and the stronger the fitness of the corresponding gene code.

Taking the edge strip as an example, the size of the edge strip corresponds to a length of the edge strip, and therefore, the layout is performed according to the length of the current layout part and the remaining length of the current standard part, and a fitness calculation formula is as follows:

$$f(L) = \frac{1}{\sum_{i=1}^{m}\left(L_{standard,i} - \sum_{j=1}^{n} L_{layout,i,j}\right)}$$

wherein $L_{standard,i}$ represents the length of the ith standard part;
$L_{layout,i,j}$ represents the length of the jth layout part arranged on the ith standard part;
m represents the number of the categories of the standard parts;
n represents the number of the categories of the layout parts;

$$\sum_{i=1}^{n} L_{layout,i,j}$$

represents the total length of all the layout parts arranged on the ith standard part;

$$L_{standard,i} - \sum_{j=1}^{n} L_{layout,i,j}$$

represents the length of the excess material after the layout part is cut on the ith standard part;

$$\sum_{i=1}^{m}\left(L_{standard,i} - \sum_{j=1}^{n} L_{layout,i,j}\right)$$

represents the total length of the excess materials of all the standard parts;
  f(L) represents the fitness, i.e., the reciprocal of the total length of the excess materials, and the smaller the total length of the excess materials, the larger the value of the fitness, and the stronger the fitness of the corresponding gene code.

After the values of the fitness of all the gene codes in the initial population are obtained, the gene codes of the initial population are sequenced according to the fitness of the gene codes to obtain a gene code sequence, and the sequencing order can be a descending order or an ascending order of the fitness. When the dominant gene code is selected, the higher the fitness is, the stronger the adaptability is, and the better the population evolution is facilitated, such that the gene code with the highest fitness in the gene code sequence can be determined as the dominant gene code, or the gene code with the fitness higher than a preset threshold in the gene code sequence can be determined as the dominant gene code, or a preset number of gene codes in a descending order in the gene code sequence can be determined as the dominant gene codes. It should be understood that, regardless of the manner in which the dominant gene code is selected, the number of the selected dominant gene codes may be one or more.

After the dominant gene code is obtained, the dominant gene code can be replicated to obtain a greater number of dominant gene codes. Referring to FIG. 5, in order to further increase the diversity of the gene codes, a specific process of performing the double-point crossing operation and the double-point mutation operation on the dominant gene codes in step S205 includes:
  first, determining at least two positions of the standard code segment in one dominant gene code (first gene code) and corresponding positions of the standard code segment in the other dominant gene code (second gene code) as standard segment crossing positions, and meanwhile determining at least two positions of the layout code segment in one dominant gene code (first gene code) and corresponding positions of the layout code segment in the other dominant gene code (second gene code) as layout segment crossing positions. The codes at the standard segment crossing positions of the at least two dominant gene codes are exchanged, and meanwhile, the codes at the layout segment crossing positions of the at least two dominant gene codes are exchanged, so as to obtain a crossing gene code. The codes at the standard segment crossing positions may or may not be adjacent, and the codes at the layout segment crossing positions may or may not be adjacent, which is not limited herein. The generated crossing gene code corresponds to a new layout scheme. When no priority is specified in the standard code segment, the standard segment crossing positions can be randomly selected; when a priority is specified in the standard code segment, the code position with the priority is not subjected to the crossing operation, and the standard segment crossing positions are randomly selected from other positions.

Secondly, at least two positions of the standard code segment in the crossing gene code are determined as standard segment mutation positions, and meanwhile, at least two positions of the layout code segment in the crossing gene code are determined as layout segment mutation positions. The codes of the standard segment mutation positions of the crossing gene code are exchanged, and meanwhile, the codes of the layout segment mutation positions of the crossing gene code are exchanged, and an obtained new gene code serves as the next generation gene code. The codes at the standard segment mutation positions may or may not be adjacent, and the codes at the layout segment mutation positions may or may not be adjacent, which is not limited herein. When no priority is specified in the standard code segment, the standard segment mutation positions can be randomly selected; when a priority is specified in the standard code segment, the code position with the priority is not subjected to the mutation operation, and the standard segment mutation positions are randomly selected from other positions.

Then, the dominant population is constructed according to the dominant gene code and the next generation gene code; that is, the generated dominant population not only includes the dominant gene code selected from the previous generation population, but also includes the new gene code generated after the dominant gene code is subjected to the crossing and mutation operations.

In the embodiment of the present disclosure, the codes at different positions of the standard segment and the layout segment are simultaneously subjected to the crossing operation, and gene code mutation is performed in an exchanging mode, such that repetition is avoided in the mutation process while randomness is ensured, and the diversity of the population is increased.

An iteration is required to be performed for the obtained dominant population to realize the population evolution. The iterative process includes: returning to step S203, acquiring the fitness of all the gene codes in the dominant population, determining the gene code corresponding to the highest fitness acquired this time as a new dominant gene code, and judging whether the value of the fitness meets the iteration termination condition; if the iteration termination condition is not met, repeating steps S204 and S205 to generate a new dominant population, and returning to step S203. By circulating the above process, continuous iterations of the dominant population are realized until the obtained fitness value meets the iteration termination condition. When the iteration termination condition is met, the iteration is terminated, the dominant gene code in the current dominant population is determined as a target gene code, and the corresponding layout scheme is the target layout scheme.

The iteration termination condition may be set as required. For example, as the iteration termination condition, the fitness is higher than a target threshold, and after the dominant gene code of the dominant population is determined each time, whether the fitness of the dominant gene code is higher than the target threshold is required to be judged, and if the fitness of the dominant gene code is higher than the target threshold, the excess material obtained by the layout scheme corresponding to the dominant gene code meets the requirement, and the iteration is terminated at this point. For another example, as the iteration termination condition, a number of iterations is higher than an iteration threshold (for example, 50, 100, 150, 200, or the like, which may be set to any value), and after the dominant gene code of the dominant population is determined each time, whether the number of iterations is higher than the iteration threshold is required to be determined, and if the number of iterations is higher than the iteration threshold, the iteration is terminated.

Figure 4:
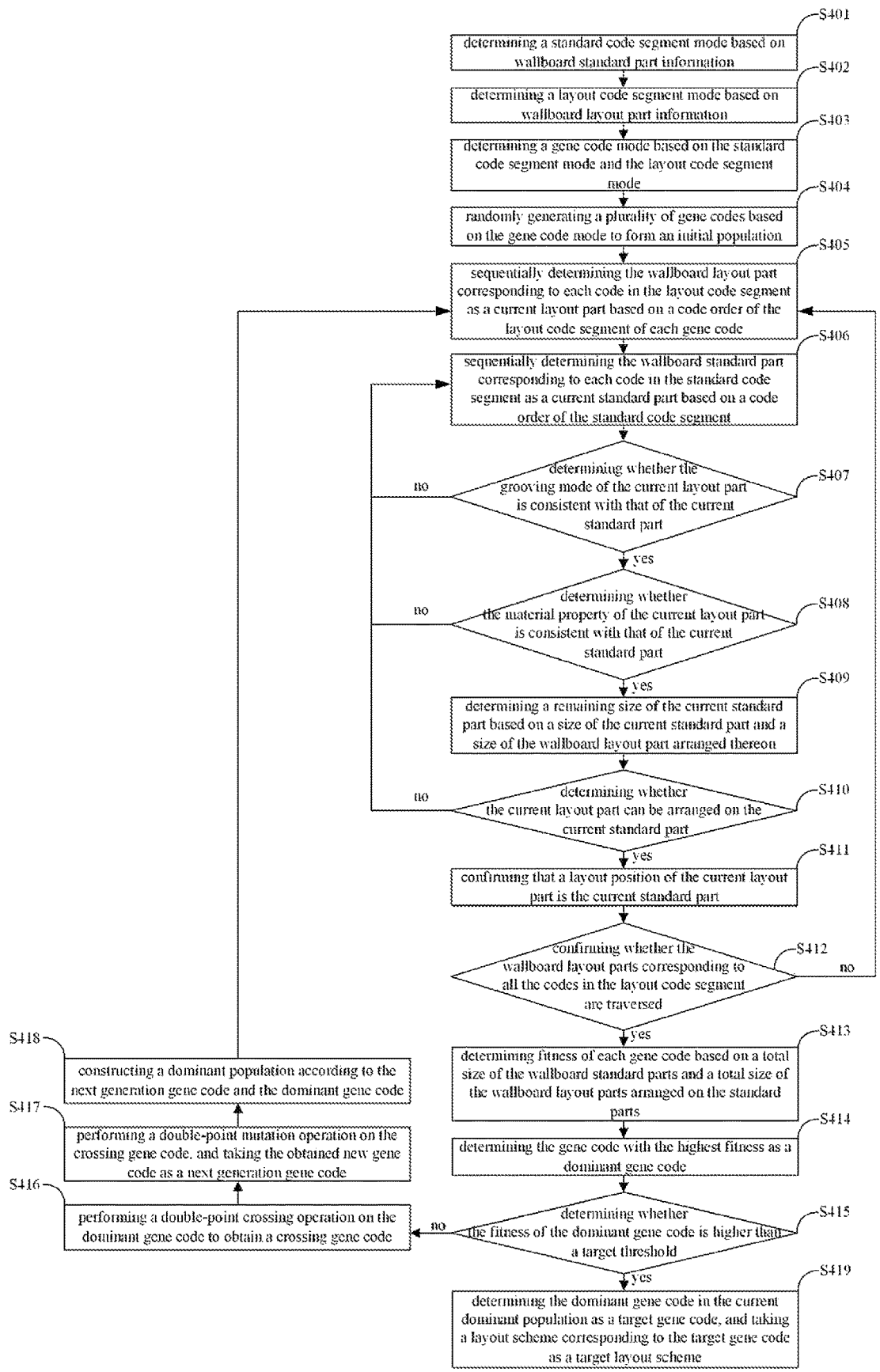
FIG. 4 is a flowchart of a specific embodiment of the layout method based on a genetic algorithm according to the embodiment of the present disclosure.

FIG. 4 is a flowchart of a specific embodiment of the layout method based on a genetic algorithm according to the present embodiment. For example, explanation is given with the wallboards as the standard parts and the layout parts, and at this point, the standard parts are the wallboard standard parts, and the layout parts are the wallboard layout parts. Referring to FIG. 5, the layout method based on a genetic algorithm includes the following steps:

S401: determining a standard code segment mode based on wallboard standard part information, wherein the wallboard standard parts have 6 categories, the 6 categories of wallboard standard parts have different sizes, attribute information includes a grooving mode (double-side grooving, single-side grooving and non-grooving) and a material property (wood grain, leather grain, stone grain, or the like), and a standard code segment includes 6 codes which are sequentially arranged;

S402: determining a layout code segment mode based on wallboard layout part information, wherein the layout parts have 10 categories, the 10 categories of wallboard layout parts have different sizes, attribute information includes a grooving mode and a material property, and a layout code segment includes 10 codes which are sequentially arranged;

S403: determining a gene code mode based on the standard code segment mode and the layout code segment mode, wherein the standard code segment is connected with the layout code segment, and each code in the standard code segment and the layout code segment is randomly generated;

S404: randomly generating a plurality of gene codes based on the gene code mode to form an initial population;

S405: sequentially determining the wallboard layout part corresponding to each code in the layout code segment as a current layout part based on a code order of the layout code segment of each gene code;

S406: sequentially determining the wallboard standard part corresponding to each code in the standard code segment as a current standard part based on a code order of the standard code segment;

S407: determining whether the grooving mode of the current layout part is consistent with that of the current standard part;

if no, returning to step S406;

if yes:

S408: determining whether the material property of the current layout part is consistent with that of the current standard part;

if no, returning to step S406;

if yes:

S409: determining a remaining size of the current standard part based on a size of the current standard part and a size of the wallboard layout part arranged thereon;

S410: determining whether the current layout part can be arranged on the current standard part or not based on the size of the current layout part and the remaining size of the current standard part;

if no, returning to step S406;

if yes:

S411: confirming that a layout position of the current layout part is the current standard part;

S412: confirming whether the wallboard layout parts corresponding to all the codes in the layout code segment are traversed;

if no, returning to step S405;

if yes:

S413: determining fitness of each gene code based on a total size of the wallboard standard parts and a total size of the wallboard layout parts arranged on the standard parts;

S414: determining the gene code with the highest fitness as a dominant gene code;

S415: determining whether the fitness of the dominant gene code is higher than a target threshold;

if no:

S416: performing a double-point crossing operation on the dominant gene code to obtain a crossing gene code;

S417: performing a double-point mutation operation on the crossing gene code, and taking the obtained new gene code as a next generation gene code;

S418: constructing a dominant population according to the next generation gene code and the dominant gene code, and returning to step S405;

if the fitness of the dominant gene code is higher than the target threshold:

S419: determining the dominant gene code in the current dominant population as a target gene code, and taking a layout scheme corresponding to the target gene code as a target layout scheme.

All the above optional technical solutions may be combined arbitrarily to form optional embodiments of the present application, and are not repeated herein.

An apparatus according to the embodiments of the present disclosure is described below, and may be configured to perform the method according to the embodiments of the present disclosure. For details not disclosed in the embodiments of the apparatus according to the present disclosure, reference is made to the embodiments of the method according to the present disclosure.

Figure 7:
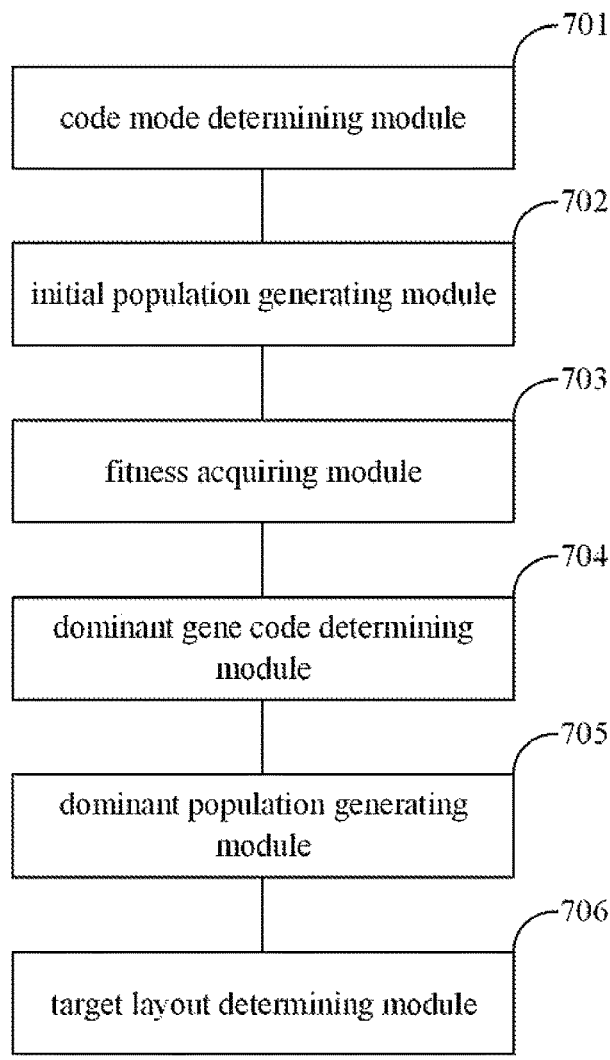
FIG. 7 is a block diagram of a layout apparatus based on a genetic algorithm according to the embodiment of the present disclosure.

FIG. 7 is a schematic diagram of a layout apparatus based on a genetic algorithm according to the embodiment of the present disclosure. As shown in FIG. 7, the layout apparatus based on a genetic algorithm includes:

a code mode determining module 701 configured to determine a gene code mode based on standard part information and layout part information;

an initial population generating module 702 configured to generate an initial population based on the gene code mode, the initial population including a plurality of gene codes, and the gene codes including standard code segments and layout code segments, and corresponding to layout schemes of standard parts and layout parts;

a fitness acquiring module 703 configured to acquire fitness of each of the plurality of gene codes;

a dominant gene code determining module 704 configured to, based on the fitness, determine the gene code corresponding to the fitness meeting a preset requirement as a dominant gene code;

a dominant population generating module 705 configured to perform a double-point crossing operation and a double-point mutation operation on the dominant gene code to generate a next generation gene code, so as to form a dominant population; and a target layout determining module 706 configured to, if a preset termination condition is met, determine the layout scheme corresponding to the dominant gene code in the dominant population as a target layout scheme.

In the technical solution of the embodiments of the present disclosure, gene coding is performed on the standard parts and the layout parts in a two-segment type code mode, the gene codes are screened using the fitness to obtain the dominant gene code, and meanwhile, the double-point crossing and mutation operations are adopted in the process of generating the dominant population, thereby greatly improving a population iteration rate, quickly obtaining the target layout scheme, reducing material loss, greatly reducing a calculation amount and improving a calculation efficiency.

In some embodiments, the fitness acquiring module 703 is specifically configured to: sequentially determine the layout part corresponding to each code in the layout code segment as a current layout part based on a code order of the layout code segment of each gene code; sequentially determine the standard part corresponding to each code in the standard code segment as a current standard part based on a code order of the standard code segment; determine whether the current layout part meets a layout requirement on the current standard part based on the standard part information and the layout part information; if yes, confirm that a layout position of the current layout part is the current standard part, and return to the step of sequentially determining the layout part corresponding to each code in the layout code segment as a current layout part based on a code order of the layout code segment; if no, return to the step of sequentially determining the standard part corresponding to each code in the standard code segment as a current standard part based on a code order of the standard code segment; and after the layout parts corresponding to all the codes in the layout code segment are traversed, determine the fitness of each gene code based on a total size of the standard parts and a total size of the layout parts arranged on the standard parts.

The dominant population generating module 705 is specifically configured to: determine at least two positions of the standard code segment in one dominant gene code and corresponding positions of the standard code segment in the other dominant gene code as standard segment crossing positions, and meanwhile determine at least two positions of the layout code segment in one dominant gene code and corresponding positions of the layout code segment in the other dominant gene code as layout segment crossing positions; exchange the codes at the standard segment crossing positions of the at least two dominant gene codes, and meanwhile exchange the codes at the layout segment crossing positions of the at least two dominant gene codes, so as to obtain a crossing gene code; determine at least two positions of the standard code segment in the crossing gene code as standard segment mutation positions, and meanwhile determine at least two positions of the layout code segment in the crossing gene code as layout segment mutation positions; exchange the codes of the standard segment mutation positions of the crossing gene code, and meanwhile exchange the codes of the layout segment mutation positions of the crossing gene code, so as to obtain the next generation gene code; and construct the dominant population according to the dominant gene code and the next generation gene code.

It should be understood that, the sequence numbers of the steps in the foregoing embodiments do not imply an execution sequence, and the execution sequence of each process should be determined by functions and internal logic of the process, and should not constitute any limitation to the implementation process of the embodiments of the present disclosure.

Figure 8:
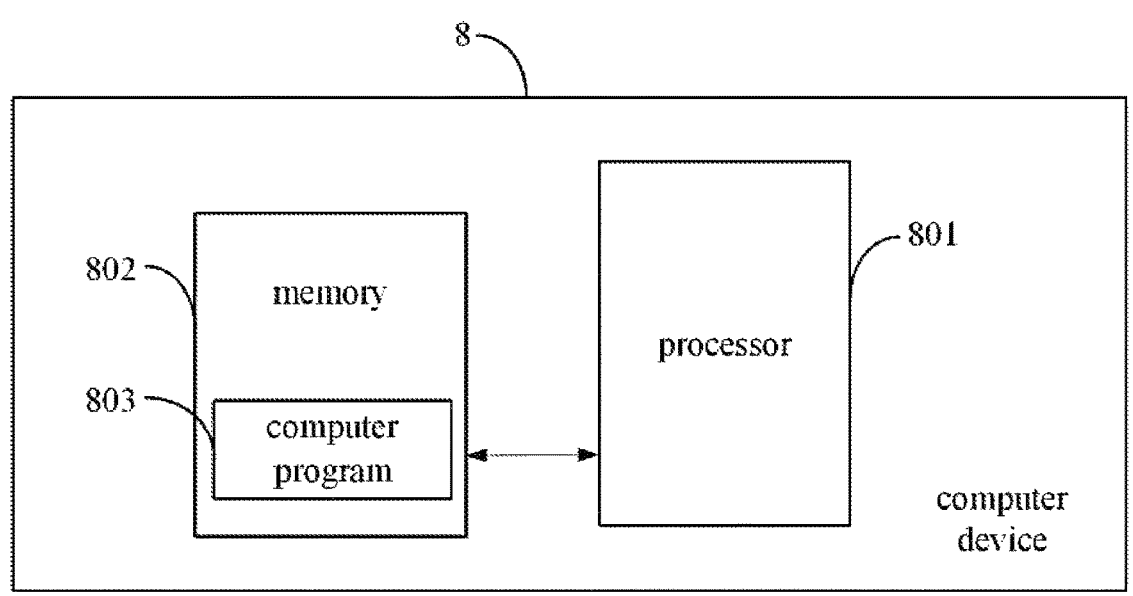
FIG. 8 is a schematic diagram of a computer device according to the embodiment of the present disclosure.

FIG. 8 is a schematic diagram of a computer device 8 according to the embodiment of the present disclosure. As shown in FIG. 8, the computer device 8 according to the present embodiment includes: a processor 801, a memory 802, and a computer program 803 stored in the memory 802 and executable on the processor 801. The steps in the various method embodiments described above are implemented when the processor 801 executes the computer program 803. Alternatively, the processor 801 achieves the functions of each module/unit in each apparatus embodiment described above when executing the computer program 803.

Exemplarily, the computer program 803 may be partitioned into one or more modules/units, which are stored in the memory 802 and executed by the processor 801 to complete the present disclosure. One or more of the modules/units may be a series of computer program instruction segments capable of performing specific functions, the instruction segments describing the execution of the computer program 803 in the computer device 8.

The computer device 8 may be a desktop computer, a notebook, a palm computer, a cloud server or another computer device. The computer device 8 may include, but is not limited to, the processor 801 and the memory 802. Those skilled in the art may understand that a structure shown in FIG. 8 is only an example of the computer device 8 and does not limit the computer device 8, which may include more or fewer components than those shown in the drawings, or some components may be combined, or a different component deployment may be used. For example, the computer device may further include an input/output device, a network access device, a bus, or the like.

The processor 801 may be a Central Processing Unit (CPU), or other general-purpose processors, Digital Signal Processors (DSP), Application Specific Integrated Circuits (ASIC), Field-Programmable Gate Arrays (FPGA) or other programmable logic devices, discrete gates or transistor logic devices, discrete hardware components, etc. The general-purpose processor may be a microprocessor or the processor may be any general processor, or the like.

The memory 802 may be an internal storage unit of the computer device 8, for example, a hard disk or memory of the computer device 8. The memory 802 may also be an external storage device of the computer device 8, such as a plug-in hard disk, a Smart Media Card (SMC), a Secure Digital (SD) Card, a Flash Card, or the like, configured on the computer device 8. Further, the memory 802 may also include both the internal storage unit and the external storage device of the computer device 8. The memory 802 is configured to store the computer program and other programs and data required by the computer device. The memory 802 may be further configured to temporarily store data which has been or will be outputted.

It may be clearly understood by those skilled in the art that, for convenient and brief description, division of the above functional units and modules is used as an example for illustration. In practical application, the above functions can be allocated to different functional units and modules and implemented as required; that is, an internal structure of the apparatus is divided into different functional units or modules to accomplish all or some of the functions described above. The functional units or modules in the embodiments may be integrated into one processing unit, or each of the units may exist alone physically, or two or more units are integrated into one unit, and the integrated unit may be implemented in a form of hardware, or may also be implemented in a form of a software functional unit. In addition, specific names of all the functional units or modules are merely for facilitating the differentiation, but are not intended to limit the protection scope of this application. For a specific working process of the units or modules in the above system, reference may be made to the corresponding process in the foregoing method embodiments, which is not repeated herein.

In the above embodiments, the description of each embodiment has its own emphasis. For a part not described in detail in one embodiment, reference may be made to relevant description of other embodiments.

Those of ordinary skill in the art would appreciate that the units and algorithmic steps of the examples described in combination with the embodiments disclosed herein can be implemented by electronic hardware or a combination of computer software and electronic hardware. Whether these functions are performed by hardware or software depends on a specific application and design constraints of the technical solution. Technical professionals may achieve the described functions in different methods for each particular application, but such implementation should not be considered beyond the scope of the present disclosure.

In the embodiments according to the present disclosure, it is to be understood that the disclosed apparatus/computer device and method can be implemented in other ways. For example, the embodiment of the apparatus/computer device described above is merely schematic. For example, the division of the modules or units is merely logical function division, and there may be other division manners in an actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between apparatuses or units may be implemented in an electric form, a mechanical form, or other forms.

The units described as separate parts may or may not be physically separate, and parts displayed as units may or may not be physical units, may be located at one position, or may be distributed on a plurality of network units. Some or all of the units may be selected according to actual needs to achieve the objectives of the solutions of the embodiments.

In addition, the functional units in the embodiments of the present disclosure may be integrated into one processing unit, or each of the units may exist alone physically, or two or more units are integrated into one unit. The integrated unit may be implemented in a form of hardware or in a form of a software functional unit.

The integrated module/unit may be stored in a computer-readable storage medium when implemented in the form of the software functional unit and sold or used as a separate product. Based on such understanding, all or some of the processes in the method according to the above embodiments may be realized in the present disclosure, or completed by the computer program instructing related hardware, the computer program may be stored in the computer-readable storage medium, and when the computer program is executed by the processor, the steps of the above method embodiments may be realized. The computer program may include a computer program code, which may be in a form of a source code, an object code or an executable file or in some intermediate forms. The computer-readable medium may include any entity or apparatus capable of carrying the computer program code, a recording medium, a USB flash drive, a removable hard disk, a magnetic disk, an optical disk, a computer memory, a Read-Only Memory (ROM), a Random Access Memory (RAM), an electrical carrier signal, a telecommunication signal, a software distribution medium, and so on. It should be noted that content included in the computer-readable medium may be appropriately increased or decreased according to requirements of legislation and patent practice in a jurisdiction, for example, in some jurisdictions, according to legislation and patent practice, the computer-readable medium does not include the electrical carrier signal and the telecommunication signal.

The above embodiments are merely intended to describe the technical solutions of the present disclosure, but not to limit the present disclosure. Although the present disclosure is described in detail with reference to the foregoing embodiments, those of ordinary skill in the art should understand that they may still make modifications to the technical solutions described in the foregoing embodiments or make equivalent replacements to some technical features thereof. Such modifications or replacements do not cause the essence of the corresponding technical solutions to depart from the spirit and scope of the technical solutions of the embodiments of the present disclosure, and should be included in the protection scope of the present disclosure.

What is claimed is:

1. A layout method based on a genetic algorithm, comprising:
   determining a gene code mode based on standard part information and layout part information;
   generating an initial population based on the gene code mode, the initial population comprising a plurality of gene codes, and the plurality of gene codes comprising standard code segments and layout code segments, and corresponding to layout schemes of standard parts and layout parts;
   acquiring fitness of each of the plurality of gene codes;
   based on the fitness, determining the gene code corresponding to the fitness meeting a preset requirement as a dominant gene code, wherein sequencing the gene codes of the initial population according to the fitness of each of the plurality of gene codes to obtain a gene code sequence; determining the gene code with highest fitness in the gene code sequence as the dominant gene code; or determining the gene code with the fitness higher than a preset threshold in the gene code sequence as the dominant gene code;
   performing a double-point crossing operation and a double-point mutation operation on the dominant gene code to generate a next generation gene code, so as to form a dominant population; and
   if a preset termination condition is met, determining the layout scheme corresponding to the dominant gene code in the dominant population as a target layout scheme;
   wherein the determining the gene code mode based on the standard part information and the layout part information comprises:
   determining a code mode of the standard code segment based on the standard part information, the standard part information comprising at least a standard part category and a standard part size, and the standard code segment comprising a number of codes and a code order;
   determining a code mode of the layout code segment based on the layout part information, the layout part information comprising at least a layout part category and a layout part size, and the layout code segment comprising a number of codes and a code order; and
   determining the gene code mode based on the code mode of the standard code segment and the code mode of the layout code segment;
   wherein the standard part information further comprises priorities of the standard parts, and the determining the code mode of the standard code segment based on the standard part information comprises:
   determining the number of codes of the standard code segment based on the standard part category;
   for the standard parts with priorities, sequentially determining the codes at corresponding positions in the standard code segment according to the priorities of the standard parts, and the codes are kept unchanged in a subsequent process; and
   for the standard parts without priorities, randomly determining the codes at corresponding positions in the standard code segment;
   wherein the performing the double-point crossing operation and the double-point mutation operation on the dominant gene code to generate the next generation gene code, so as to form the dominant population comprises:
   determining at least two positions of the standard code segment in a first one dominant gene code and corresponding positions of the standard code segment in a second one dominant gene code as standard segment crossing positions, and meanwhile determining at least two positions of the layout code segment in the first one dominant gene code and corresponding positions of the layout code segment in the second one dominant gene code as layout segment crossing positions; wherein when no priority is specified in the standard code segment, the standard segment crossing positions are allowed to be randomly selected in the standard code segment; when a priority is specified in the standard code segment, a code position with the priority is not subjected to the crossing operation, and the standard segment crossing positions are randomly selected from other positions of the standard code segment;
   exchanging the codes at the standard segment crossing positions of the at least two dominant gene codes, and meanwhile exchanging the codes at the layout segment crossing positions of the at least two dominant gene codes, so as to obtain a crossing gene code;
   determining the at least two positions of the standard code segment in the crossing gene code as standard segment mutation positions, and meanwhile determining the at least two positions of the layout code segment in the crossing gene code as layout segment mutation positions; wherein when no priority is specified in the standard code segment, the standard segment mutation positions are allowed to be randomly selected in the standard code segment; when a priority is specified in the standard code segment, a code position with the priority is not subjected to the mutation operation, and the standard segment mutation positions are randomly selected from other positions of the standard code segment;
   exchanging the codes of the standard segment mutation positions of the crossing gene code, and meanwhile exchanging the codes of the layout segment mutation positions of the crossing gene code, so as to obtain the next generation gene code; and
   constructing the dominant population according to the dominant gene code and the next generation gene code.

2. The method according to claim 1, wherein the acquiring the fitness of each of the plurality of gene codes comprises:

sequentially determining the layout part corresponding to each code in the layout code segment as a current layout part based on a code order of the layout code segment of each of the plurality of gene codes;

sequentially determining the standard part corresponding to each code in the standard code segment as a current standard part based on a code order of the standard code segment;

determining whether the current layout part meets a layout requirement on the current standard part based on the standard part information and the layout part information;

if yes, confirming that a layout position of the current layout part is the current standard part, and returning to the step of sequentially determining the layout part corresponding to each code in the layout code segment as the current layout part based on the code order of the layout code segment;

if no, returning to the step of sequentially determining the standard part corresponding to each code in the standard code segment as the current standard part based on the code order of the standard code segment; and after the layout parts corresponding to all the codes in the layout code segment are traversed, determining the fitness of each of the plurality of gene codes based on a total size of the standard parts and a total size of the layout parts arranged on the standard parts.

3. The method according to claim 2, wherein the standard part information comprises a standard part category and a standard part size, and the layout part information comprises a layout part category and a layout part size;

the determining whether the current layout part meets the layout requirement on the current standard part based on the standard part information and the layout part information comprises:

determining a remaining size of the current standard part based on the size of the current standard part and the size of the layout part arranged on the current standard part; and determining whether the current layout part is allowed to be arranged on the current standard part or not based on the size of the current layout part and the remaining size of the current standard part.

4. A computer device, comprising a memory, a processor and a computer program stored in the memory and runnable on the processor, wherein the processor, when executing the computer program, implements the steps of the method according to claim 3.

5. The method according to claim 2, wherein the standard part information comprises a standard part category, a standard part size and attribute information of the standard parts, the layout part information comprises a layout part category, a layout part size and attribute information of the layout parts, and the attribute information comprises at least one of a grooving mode, a color and a material property;

the determining whether the current layout part meets the layout requirement on the current standard part based on the standard part information and the layout part information comprises:

determining whether the attribute information of the current layout part is consistent with the attribute information of the current standard part;

if yes, determining a remaining size of the current standard part based on the size of the current standard part and the size of the layout part arranged on the current standard part; and determining whether the current layout part is allowed to be arranged on the current standard part or not based on the size of the current layout part and the remaining size of the current standard part.

6. A computer device, comprising a memory, a processor and a computer program stored in the memory and runnable on the processor, wherein the processor, when executing the computer program, implements the steps of the method according to claim 5.

7. The method according to claim 2, wherein the determining the fitness of each of the plurality of gene codes based on the total size of the standard parts and the total size of the layout parts arranged on the standard parts comprises:

determining excess materials of each category of standard parts based on the size of each category of standard parts and the total size of the layout parts arranged on the standard parts;

based on the excess materials of each category of standard parts, determining total excess materials of the standard parts; and determining the fitness of each of the plurality of gene codes based on the total excess materials, the fitness being a reciprocal of the total excess materials.

8. A computer device, comprising a memory, a processor and a computer program stored in the memory and runnable on the processor, wherein the processor, when executing the computer program, implements the steps of the method according to claim 7.

9. A computer device, comprising a memory, a processor and a computer program stored in the memory and runnable on the processor, wherein the processor, when executing the computer program, implements the steps of the method according to claim 2.

10. The method according to claim 1, wherein the if the preset termination condition is met, determining the layout scheme corresponding to the dominant gene code in the dominant population as the target layout scheme comprises:

acquiring the fitness of each of the plurality of gene codes in the dominant population, and determining the gene code with highest fitness of the plurality of gene codes as the dominant gene code;

if the fitness of the dominant gene code is higher than a target threshold, ending iterations, and determining the layout scheme corresponding to the dominant gene code as the target layout scheme; or if a number of iterations is higher than an iteration threshold, ending the iterations, and determining the layout scheme corresponding to the dominant gene code as the target layout scheme.

11. A computer device, comprising a memory, a processor and a computer program stored in the memory and runnable on the processor, wherein the processor, when executing the computer program, implements the steps of the method according to claim 10.

12. A computer device, comprising a memory, a processor and a computer program stored in the memory and runnable on the processor, wherein the processor, when executing the computer program, implements the steps of the method according to claim 1.

13. A layout apparatus based on a genetic algorithm, comprising:

a code mode determining module configured to determine a gene code mode based on standard part information and layout part information;

an initial population generating module configured to generate an initial population based on the gene code mode, the initial population comprising a plurality of gene codes, and the plurality of gene codes comprising standard code segments and layout code segments, and corresponding to layout schemes of standard parts and layout parts;

a fitness acquiring module configured to acquire fitness of each of the plurality of gene codes;

a dominant gene code determining module configured to, based on the fitness, determine the gene code corresponding to the fitness meeting a preset requirement as a dominant gene code, wherein sequencing the gene codes of the initial population according to the fitness of each of the plurality of gene codes to obtain a gene code sequence; determining the gene code with highest fitness in the gene code sequence as the dominant gene code; or determining the gene code with the fitness higher than a preset threshold in the gene code sequence as the dominant gene code;

a dominant population generating module configured to perform a double-point crossing operation and a double-point mutation operation on the dominant gene code to generate a next generation gene code, so as to form a dominant population; and a target layout determining module configured to, if a preset termination condition is met, determine the layout scheme corresponding to the dominant gene code in the dominant population as a target layout scheme;

wherein the code mode determining module is configured to: determine a code mode of the standard code segment based on the standard part information, the standard part information comprising at least a standard part category and a standard part size, and the standard code segment comprising a number of codes and a code order; determine a code mode of the layout code segment based on the layout part information, the layout part information comprising at least a layout part category and a layout part size, and the layout code segment comprising a number of codes and a code order; and determine the gene code mode based on the code mode of the standard code segment and the code mode of the layout code segment;

wherein the standard part information further comprises priorities of the standard parts, and the code mode determining module is configured to: determine the number of codes of the standard code segment based on the standard part category; for the standard parts with priorities, sequentially determine the codes at corresponding positions in the standard code segment according to the priorities of the standard parts, and the codes are kept unchanged in a subsequent process; and for the standard parts without priorities, randomly determine the codes at corresponding positions in the standard code segment;

wherein the dominant population generating module is configured to: determine at least two positions of the standard code segment in a first one dominant gene code and corresponding positions of the standard code segment in a second one dominant gene code as standard segment crossing positions, and meanwhile determine at least two positions of the layout code segment in the first one dominant gene code and corresponding positions of the layout code segment in the second one dominant gene code as layout segment crossing positions; wherein when no priority is specified in the standard code segment, the standard segment crossing positions are allowed to be randomly selected in the standard code segment; when a priority is specified in the standard code segment, a code position with the priority is not subjected to the crossing operation, and the standard segment crossing positions are randomly selected from other positions of the standard code segment; exchange the codes at the standard segment crossing positions of the at least two dominant gene codes, and meanwhile exchange the codes at the layout segment crossing positions of the at least two dominant gene codes, so as to obtain a crossing gene code; determine the at least two positions of the standard code segment in the crossing gene code as standard segment mutation positions, and meanwhile determine the at least two positions of the layout code segment in the crossing gene code as layout segment mutation positions; wherein when no priority is specified in the standard code segment, the standard segment mutation positions are allowed to be randomly selected in the standard code segment; when a priority is specified in the standard code segment, a code position with the priority is not subjected to the mutation operation, and the standard segment mutation positions are randomly selected from other positions of the standard code segment; exchange the codes of the standard segment mutation positions of the crossing gene code, and meanwhile exchange the codes of the layout segment mutation positions of the crossing gene code, so as to obtain the next generation gene code; and construct the dominant population according to the dominant gene code and the next generation gene code.

* * * * *